United States Patent [19]

Tanaka et al.

[11] Patent Number: 4,475,973

[45] Date of Patent: Oct. 9, 1984

[54] METHOD FOR PRODUCTION OF A FLUID SEPARATION MODULE

[75] Inventors: Toshiaki Tanaka; Ichiro Kawata; Keisuke Nakagome; Koji Matsui, all of Ibaraki, Japan

[73] Assignee: Nitto Electric Industrial Company, Ltd., Osaka, Japan

[21] Appl. No.: 418,295

[22] Filed: Sep. 15, 1982

[30] Foreign Application Priority Data

Sep. 16, 1981 [JP] Japan .............................. 56-138130[U]

[51] Int. Cl.³ ............................................ B01D 31/00
[52] U.S. Cl. .................................... 156/184; 156/192; 156/187; 210/497.1
[58] Field of Search ................ 156/446, 184, 190–192, 156/457, 458, 447; 210/497.01, 497.1, 321.5, 487, 321.1, 493.4, 494.1; 53/117–119; 242/56 A, 56.1, 67.1 R

[56] References Cited

U.S. PATENT DOCUMENTS

| | | | |
|---|---|---|---|
| 2,213,109 | 8/1940 | Spievak | 53/119 |
| 3,008,662 | 11/1961 | Clemens | 242/67.1 R |
| 4,235,723 | 11/1980 | Bartlett | 210/497.1 X |

Primary Examiner—David Simmons
Attorney, Agent, or Firm—Armstrong, Nikaido, Marmelstein & Kubovcik

[57] ABSTRACT

A method for easily providing a spiral type-fluid separation module by horizontally rotating a mandrel around its axis from which one or more layer arrangements consisting of a plurality of layer elements hang downward, and winding the layer arrangements about the mandrel without occurance of non-uniform shifting and wrinkles in the layer elements, while applying tension to at least one layer element by means of a tension system.

6 Claims, 5 Drawing Figures

METHOD FOR PRODUCTION OF A FLUID SEPARATION MODULE

BACKGROUND OF THE INVENTION

The present invention relates to a method for production of a fluid separation module, specifically, a spiral type-fluid separation module, More particularly, it relates to a method for production of a fluid separation module having a hollow mandrel with one or more layer arrangements, each comprising a plurality of layer elements, wherein the method comprises horizontally fastening the mandrel to a means for rotating the mandrel around its axis so that the layer arrangements hang downward, and rotating the mandrel around its axis by means of the rotating means so as to wind the layer arrangements thereon.

In general, for production of a spiral type-liquid separation module, a plurality of layer elements consisting of a spacing layer for the passage of a permeated solution, a first semipermeable membrane sheet, another spacing layer for the passage of a feed solution and a second semipermeable membrane sheet, in sequence, are piled on top of one another to form one or more layer arrangements and then they are spirally wound about the mandrel on a table, However, with this production method, the differences in curvatures of neighboring inner and outer layer elements in the layer arrangements wound about the mandrel cause a difference in the winding velocities of the layer elements. This results in a non-uniform shifting and resulting wrinkles in the inner layer elements. The non-uniform shifting and resulting wrinkles would be readily avoidable if the neighboring layer elements were smoothly slidable on each other thereby enabling a slidable winding of the layer arrangements about the mandrel. However, the layer elements, such as membrane sheets and spacing layers employed in the liquid separation module, are not smoothly slidable because of friction therebetween. Moreover, this tendency becomes greater as the number of layer arrangements increases. This non-uniform shifting and resulting wrinkles unavoidably occur in the layer elements, particularly in the membrane sheets, and damage these membrane sheets, thereby adversely affecting the separation function of the liquid separation module. The wrinkles in the spacing layers for a permeated solution and a feed solution cause the local occurrence of pressure against the membrane sheets, resulting in damage and lack of membrane-sealing in the membrane sheets thereby adversely affecting the separation function of the liquid separation module.

For the purpose of elimination of this non-uniform shifting and resulting wrinkles, some improved methods have been proposed. One is described in U.S. Pat. No. 3,386,583 and U.S. Pat. No. 3,397,790 wherein the layer arrangements are wound about the mandrel while applying tension to the layer elements separately. Another is described in U.S. Pat. No. 4,137,113 wherein the layer elements, just before reaching the mandrel, are separated from each other and each is subjected to radial tension while being wound about the mandrel. However, these conventional methods require not only large scale-production equipment but also troublesome operation processes.

SUMMARY OF THE INVENTION

The method of this invention which overcomes the above-discussed disadvantages of the prior art, comprises: horizontally fastening the hollow mandrel to a means for rotating the mandrel around its axis so that the layer arrangements hang downward, and rotating the mandrel around its axis by means of the rotating means so as to wind the layer arrangements thereon.

One or more layer arrangements to be wound about the mandrel comprise a plurality of layer elements consisting of a spacing layer for the passage of a permeated solution, a first semipermeable membrane sheet, another spacing layer for the passage of a feed solution and a second semipermeable membrane in sequence; an envelope being consequently formed by said first semipermeable membrane sheet in each individual layer arrangement and said second semipermeable membrane sheet in the neighboring layer arrangement, in such a manner that said permeated solution-spacing layer in each individual layer arrangement is disposed in said envelope.

The layer arrangements are wound about the mandrel while proper tension is given to at least one, which is connected to the mandrel, of the permeated solution-spacing layers. The angle of the spacing layer to which tension is applied preferably ranges between about $+30°$ to about $-30°$ from a vertical plane through the axis of the mandrel.

Supporting bars may be disposed on the back of each envelope to ensure a space between the back of each envelope and the neighboring layer element.

Thus, the invention described herein makes possible the objectives of; (a) providing a method for production of a spiral type-liquid separation module wherein non-uniform shifting and wrinkles do not occur in the layer elements thereby obtaining an excellent fluid-separation function; and (b) providing a method for production of a spiral type-fluid separation module using production equipment with a remarkably simple and small scale apparatus.

BRIEF DESCRIPTION OF THE DRAWINGS

This invention may be better understood and its numerous objectives and advantages will become apparent to those skilled in the art by reference to the accompanying drawings as follows.

DESCRIPTION OF THE PREFERRED EMBODIMENT

Figure 1:
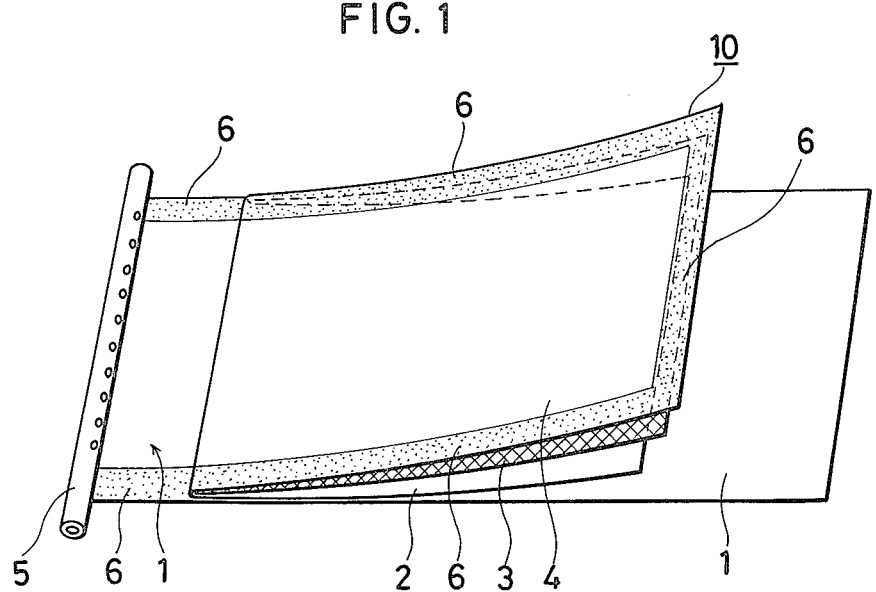
FIG. 1 is a perspective view of a layer arrangement to be wound about a hollow mandrel in this invention.

FIG. 1 shows a layer arrangement 10 of this invention. The layer arrangement 10 comprises the layer elements of a spacing layer 1 for the passage of a permeated solution, a first semipermeable membrane sheet 2, a spacing layer 3 for the passage of a feed solution and a second semipermeable membrane sheet 4 in sequence which are piled on top of one another. The first membrane sheet 2 and the second membrane sheet 4 are usually formed from one sheet to be folded in two. The first and the second membrane sheets 2,4 may be formed from two separate sheets, which are adhered to each other through the spacing layer 3 at the edge nearer the mandrel.

An example of the semipermeable membrane is made of polymer of cellulose acetate, polyamide or the like which is usually employed as a reverse osmosis membrane or an ultra filtration membrane. An example of the spacing layer for the passage of a permeated solution is a fabric of polyester (Tradename: TRICOT 213, SIMPLEX 139) impregnating melamine, formalin or epoxy resin. An example of the spacing layer for the passage of a feed solution is a polypropylene net or a polyethylene net (Tradename: VEXAR).

In winding the layer arrangement 10 about the hollow mandrel 5, one end of the permeated solution-spacing layer 1 is first connected to the mandrel 5 so that the permeated solution flows into the mandrel 5 through at least one hole of the outer circumference thereof. For the connection of the spacing layer 1 to the mandrel 5, a known adhesive tape such as a pressure sensitive adhesive tape or a known thermoplastic adhesive may be employed. Thereafter, the three oiuter edges of the layer arrangement 10 are coated with a membrane-sealing adhesive 6 to thereby adhere the first semipermeable membrane sheet 2 to the second semipermeable membrane sheet 4 forming an envelope, in which the spacing layer 1 for the passage of the permeated solution will be disposed in the final module. Thus, the membrane-sealing adhesive 6 prevents the feed solution from flowing into the passage for the permeated solution without passing through the semipermeable membranes 2,4. The adhesive 6 applied to the membrane sheet 4 may penetrate the spacing layer 1 and reach the other membrane sheet 2, so that adhesive used may be applied to the one surface of either semipermeable membrane 2,4 or permeated solution-spacing layer 1 which comes into contact with the other semipermeable membrane or permeated solution-spacing layer. The pot life of the adhesive 6 used must be longer than the period of time required to wind the layer arrangement 10 about the mandrel 5. Otherwise, during the winding process of the layer arrangement 10, the adhesive 6 may become cured so that the layer elements in the layer arrangement 10 will not smoothly slide on each other and/or the adhesive 6 if applied to one membrane sheet will not penetrate the spacing layer 1 thereby preventing the adhesion of one membrane sheet to the other membrane sheet through the spacing layer 1. An example of the adhesive 6 is a liquid material, curable at an ambient temperature, of epoxy resin or urethane resin. Alternatively, a common heat-sealing technique may be used for such membrane-sealing.

Figure 2:
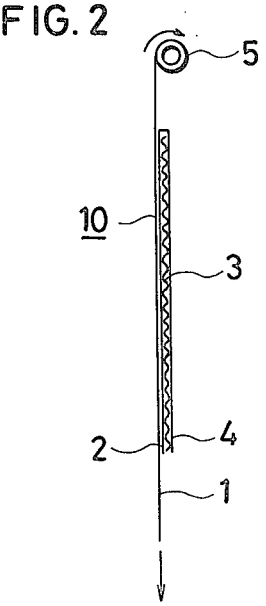
FIG. 2 is an illustration view showing a winding process of a layer arrangement according to this invention.

The layer arrangement 10 is wound about the hollow mandrel 5 as shown in FIG. 2, wherein the mandrel 5 is horizontally fastened at the ends thereof to a means (not shown) for rotating the mandrel 5 around its axis so that the layer arrangement 10 hangs downward. The mandrel 5 is then rotated around its axis by driving the rotating means so as to wind the layer arrangement 10 thereon while the layer arrangement 10 hangs downward from the mandrel 5. The rotation rate should be slow, for example, below 5 rpm, preferably 1-2 rpm. The layer elements hang downward under their own weight and friction between each element is so small that the non-uniform shifting and wrinkles do not occur in the layer elements. After most of the layer arrangement 10 has been wound (e.g. 90% of the winding process completed), it is tightened by applying tension to the permeated solution-spacing layer 1 by means of a known tension system (not shown). The extent of tension to be applied is in the range of, for example, 10 to 60 kgf per 1 meter of width of the layer arrangement 10. Alternatively, the layer arrangement 10 is wound about the mandrel 5 while applying proper tension to the permeated solution-spacing layer 1 by means of a known tension system. After most of the layer arrangement 10 has been wound (e.g., 90% of the winding process completed), it is tightened by applying tension, the extent of which is in the range of about 10 to 60 kgf per 1 meter of width of the layer arrangement 10, to the permeated solution-spacing layer 1 by means of the tension system. The application of a greater amount of tension causes excess pressure of the feed solution-spacing layer 3 on the membrane sheets 2,4, resulting in damage to the membrane sheets 2,4. The application of a lesser amount of tension causes insufficient sealing between membrane sheets 2 and 4 resulting in the formation of an incomplete envelope, thereby failing to achieve a fluid separation module with the expected separation-function. The angle of the spacing layer 1 to which tension is applied preferably ranges between about $+30°$ to about $-30°$ from a vertical plane through the axis of the mandrel 5. Where the spacing layer 1 for the passage of the permeated solution is subjected to tension within these angle ranges, the mandrel 5 may be positioned at a lower level without increasing friction between the layer elements thereby enabling reduction of the overall height of the winding equipment.

Upon completion of the winding of the layer arrangement 10, the tail end of the layer arrangement 10 is fixed to the resulting wound body by means of an adhesive tape or a thermoplastic adhesive.

After the membrane-sealing adhesive has been cured, the edges of the wound body are trimmed to a predetermined size and then combined with necessary attachments to obtain the desired fluid separation module.

Figure 3:
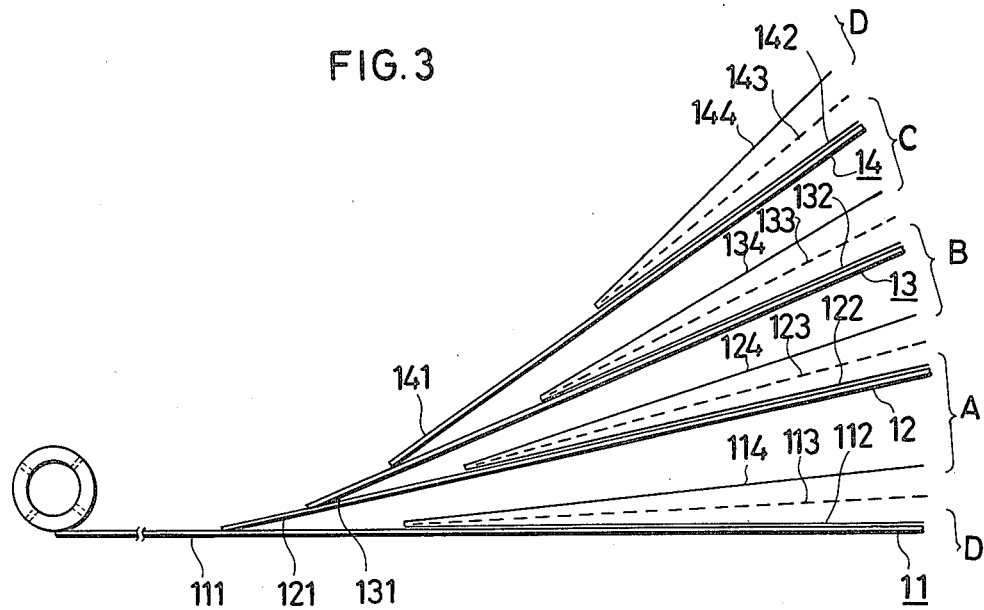
FIG. 3 is a side view of four layer arrangements to be wound about a hollow mandrel in this invention.
Figure 4:
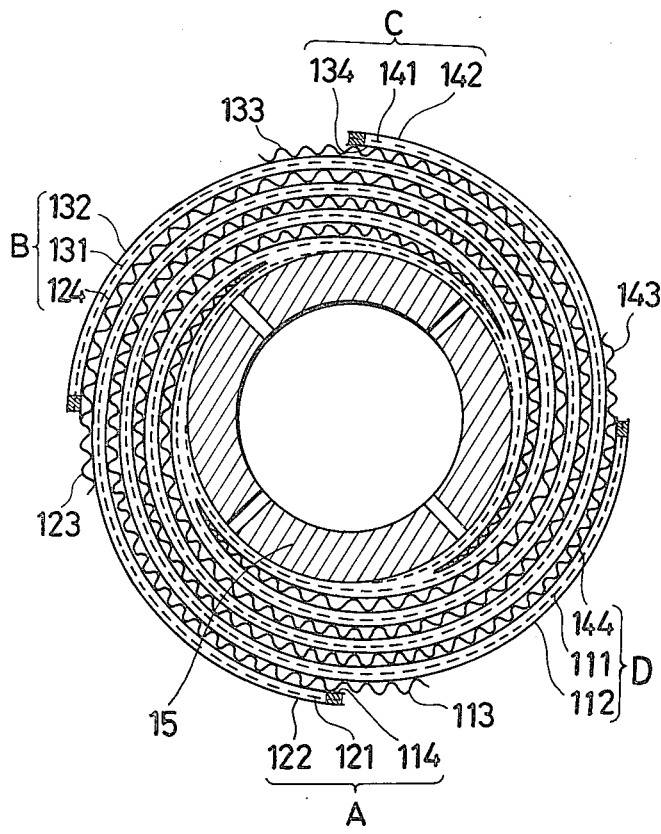
FIG. 4 is a sectional side view showing four layer arrangements wound about the mandrel according to this invention.

FIG. 3 shows a plurality of layer arrangements, for example, four layer arrangements 11, 12, 13 and 14. FIG. 4 shows a wound body obtained by winding the layer arrangements 11, 12, 13 and 14 about the hollow mandrel 15. Each layer arrangement is constituted in the same manner as in the aforementioned layer arrangement 10, wherein the spacing layers 121, 131 and 141 for the passage of a permeated solution are, respectively, fixed to the spacing layers 111, 121 and 131 for the passage of the permeated solution, in sequence, by means of an adhesive. The envelopes, shown as A, B, C and D in FIGS. 3 and 4, are generally formed by the first and the second semipermeable membrane sheets in the final module in such a manner that the permeated solution-spacing layer in each individual layer arrangement is disposed between the first semipermeable membrane sheet in each individual layer arrangement and the second semipermeable membrane sheet in the neighboring layer arrangement. For example, with the envelope A, the spacing layer 121 for the passage of the permeated solution is disposed between the first membrane sheet 122 in the layer arrangement 12 and the second membrane sheet 114 in the neighboring layer arrangement 11; and, with the envelope D, the spacing layer 111 for the passage of the permeated solution is disposed between the first membrane sheet 112 in the layer arrangement 11 and the second membrane sheet 114 in the neighboring layer arrangement 14.

The plurality of layer arrangements 11, 12, 13 and 14 are wound about the mandrel 15 in a horizontal manner, hanging downward from the mandrel 15, in the same manner as in a single layer arrangement 10. Tension is given to at least one spacing layer 111, which is directly connected to the mandrel 15, of the spacing layers 111, 121, 131 and 141 for the passage of the permeated solution. In order to reduce the load put upon the adhesive used to attach the spacing layer 111 to the mandrel 15, it is recommended that the spacing layer 111 be prewound by at least one revolution around the mandrel 15 before the mandrel 15 is fastened to the winding means.

Figure 5:
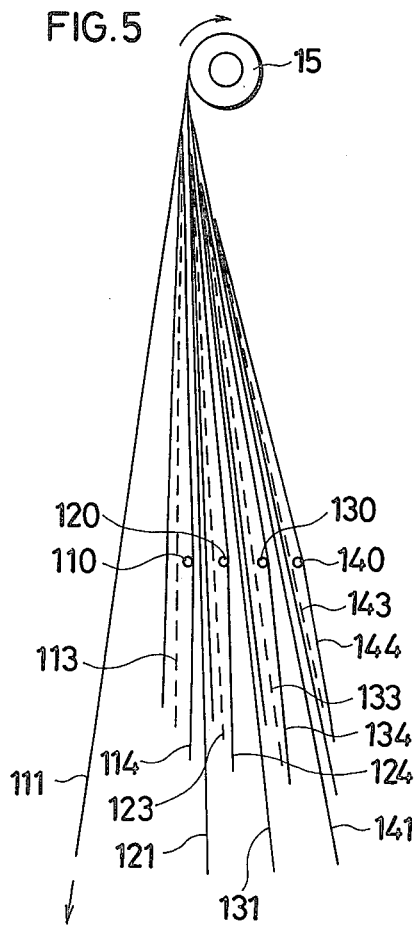
FIG. 5 is an illustration view showing a winding process of four layer arrangements according to this invention.

In order to increase the winding rate of the layer arrangements for greater operation efficiency, as shown in FIG. 5, the supporting bars 110, 120, 130 and 140 may be disposed on the back of each sheet of the envelopes A, B, C and D, namely, the second membrane sheets 114, 124, 134 and 144, to ensure a space between the back of each sheet 114, 124, 134, 144 and each neighboring layer element, namely, each spacing layer 113, 123, 133, 143 for the passage of the feed solution.

Instead of solution, gasses such as nitrogen may be treated in the same manner as in the abovementioned.

We claim:

1. A method for production of a fluid separation module having a hollow mandrel with one or more layer arrangements, each comprising a plurality of layer elements, wherein said method comprised the steps of:
   horizontally fastening said mandrel to a means for rotating said mandrel around its axis so that said layer arrangements hang downward, each of said layer arrangements comprising a plurality of layer elements which consist of a spacing layer for the passage of a permeated solution, a first semi-permeable membrane sheet, another spacing layer for the passage of a feed solution, and a second semi-permeable membrane, in sequence, an envelope being consequently formed by said first semi-permeable membrane sheet in each individual layer arrangement and said second semi-permeable membrane sheet in the neighboring layer arrangement, in such a manner that said permeated solution spacing layer in each individual layer arrangement is disposed in said envelope, and
   rotating said mandrel around its axis by means of said rotating means so as to wind said layer arrangements thereon until most of the layer arrangements have been wound, and
   after most of the layer arrangements have been wound, applying proper tension to at least one of said permeated solution spacing layers by means of a tension system, the angle of said spacing layer to which tension is applied ranging from about +30° to about −30° from a vertical plane through the axis of said mandrel.

2. A method for production of a fluid separation module according to claim 1, wherein said permeated solution spacing layer is attached to said mandrel and said tension is applied to said permeated solution spacing layer.

3. A method for production of a fluid separation module according to claim 1, where the extent of said tension is in the range of 10 to 60 kgf per 1 meter of width of the layer arrangement.

4. A method for production of a fluid separation module according to claim 1, wherein the rotation rate of said mandrel is below 5 rpm.

5. A method for production of a fluid separation module according to claim 1, wherein the rotation rate of said mandrel is in the range of 1-2 rpm.

6. A method for production of a fluid separation module according to claim 4, wherein supporting bars are disposed on each back of said envelopes to ensure a space between said back of each envelope and the neighboring layer element.

* * * * *